May 24, 1949.　　　P. R. HIRSH　　　2,470,818
PIPE JOINT
Filed Sept. 25, 1945
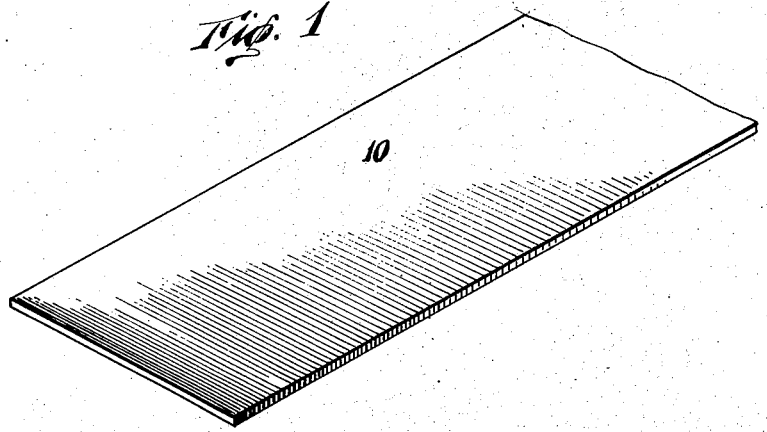
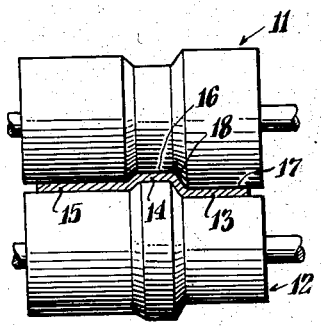
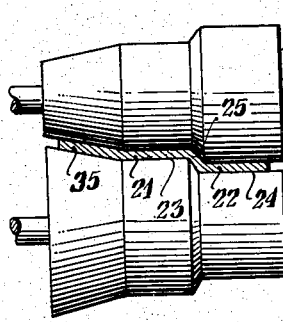
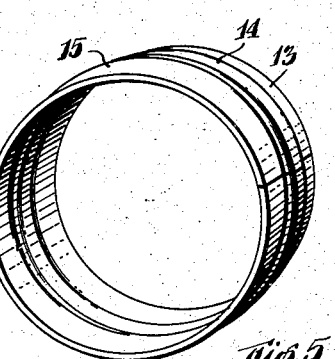
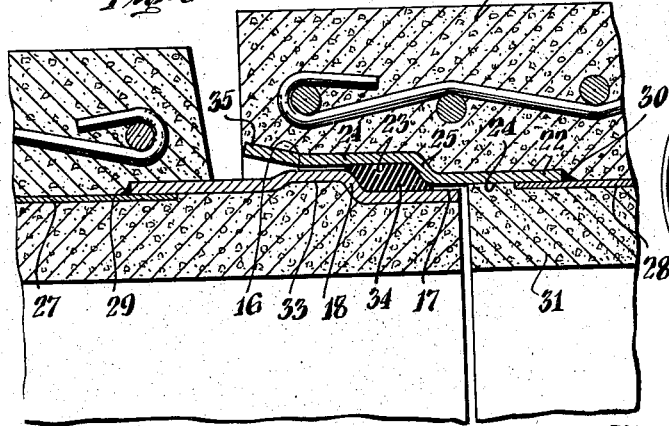
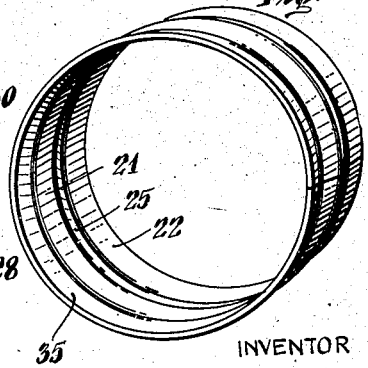
INVENTOR
Philip R. Hirsh
BY Ernest D. Given
ATTORNEY Patented May 24, 1949

2,470,818

UNITED STATES PATENT OFFICE 2,470,818

PIPE JOINT

Philip R. Hirsh, Montclair, N. J., assignor to Lock Joint Pipe Company, East Orange, N. J., a corporation of New Jersey Application September 25, 1945, Serial No. 618,542

3 Claims. (Cl. 285—115)

This invention relates to pipes and has among its objects to effect economies in the manufacture of reinforced concrete pipes and provide highly efficient means for sealing joints between such pipes.

Concrete pipes wherein steel cylinders are encased within concrete commonly employ steel spigot and bell rings which are secured to the ends of the steel cylinders to provide joining surfaces for forming joints. Steel joint rings of one type have their cross-sectional configurations originally rolled into material which is furnished by the steel mill in strip form as special shapes. These special shapes are purchased according to specifications, cut to required lengths, and formed into joint rings. Other joint elements are built up by the employment of individual plain rings which are mounted at the ends of pipes in such an arrangement as to support and retain gaskets in closed joints. Joints having grooved spigot rings made from special shapes and built from plain rings are illustrated in United States Patent 2,138,946. Howsoever the joining elements are made, it is important that the groove for retaining a gasket of rubber or of rubber-like material provide, in cooperation with the enclosing bell, a properly proportioned space for accommodating the gasket which is to be used.

Rubber gaskets are molded and have a uniform cross-section, and since rubber is relatively incompressible, the gaskets exert considerable restraint to the engagement of the pipe ends if the rings and grooves are not correctly dimensioned to accommodate a given gasket. Furthermore, a variation in the cross-sectional dimensions of the gasket-confining space leads to unequal sealing efficiency of a gasket of a given cross-sectional area. If a groove is too spacious, the joint will leak at a pressure below the highest pressure intended. Then too, the clearance between spigot and bell joint-rings, and hence, the accuracy of their dimensions, are important factors for obtaining sound joints. If the clearance between the joint rings is too great, unequal sealing may result in different parts of a joint.

The attainment of uniformly sound joints is a desired objective of the present invention. Another objective is to improve upon practices for constructing reinforced concrete pipes by forming the joining elements of a joint economically and without sacrifice of the high sealing qualities attainable. Economies are effected in dispensing with the employment of prefabricated special shapes, also by avoiding machining, and by avoiding the use of individual plain rings for forming joining elements. Each joint ring is made by the pipe manufacturer who obtains plain strip-material of uniform thickness, cuts the strip-material to proper lengths, forms the cut strips into rings, rolls into the rings the sections desired, and accurately trues the formed rings to provide accurately dimensioned cooperating surfaces. Novel spigot and bell joint-rings result which have functional surfaces correctly proportioned to enclose a gasket and close a joint. As a consequence, a reinforced concrete pipe of the bell and spigot variety is obtained in which the joining elements are so formed and constructed as to assure uniformly sound sealing qualities and the formation of joints particularly efficacious for sealing against high pressures.

Other objects and attainments of the present invention will appear hereinafter in the accompanying disclosure of the principle of the invention and the best mode I have contemplated for embodying it.

In the drawings,

Fig. 1 illustrates a portion of a flat strip of steel from which the joint rings are formed;

Figs. 2 and 3 illustrate, respectively, rolls for rolling the cross-sections of spigot and bell rings;

Figs. 4 and 5 show finished spigot and bell rings, respectively; and

Fig. 6 is a section through a joint of a concrete pipe.

Each of the spigot and bell rings of the joint of the present invention is made from a single piece of flat strip steel 10 of substantially uniform thickness, of which an end is illustrated in Fig. 1. The flat strips, as obtained from the steel mill, are cut to the requisite lengths to provide the respective joint rings when the rings are completed. The flat strips are then rolled into circular rings. The ends of each ring are welded together and the welded areas are ground to remove the burrs. The desired cross-sections are formed into the respective rings by rolling them into the rings.

The cross-sectional form of the spigot ring is obtained by rolling the plain ring, which was prepared to serve as the spigot ring in the manner previously described, between rolls 11 and 12, Figure 2. These rolls form three connected annular portions 13, 14 and 15, having different diameters, with the middle portion 14 having the larger diameter and providing a cylindrical bearing surface 16.

The exterior surface 17 of annular spigot portion 13 is radially offset from the cylindrical bearing surface 16, a predetermined distance which is dependent upon the size of the gasket to be used in the finished joint, and the amount of space to be provided therefor. A laterally extending portion 18 joins the middle annular portion 14 with the annular portion 13. This laterally extending portion 18 functions to provide an axial thrust upon a gasket when a joint is closed, and it may be substantially vertically disposed, as preferred.

The cross-sectional form desired for the bell ring is likewise rolled into a ring previously prepared for this purpose by rolls 19 and 20, Fig. 3, which form two annular cylindrical portions 21 and 22, the former of which is given such a diameter as to provide an inner bearing surface 23 for engaging or slightly clearing the cylindrical bearing surface 16 of the spigot ring, and the latter of which is given such a diameter as to provide an inner cylindrical surface 24 which will clear the outer cylindrical surface 17 of the spigot ring when the two rings are cooperating to form a joint in the manner illustrated in Fig. 6. The laterally extending portion 25, which connects the annular portions 21 and 22, is preferably disposed similarly to the laterally extending portion 18 of the spigot ring, so that when a joint is closed, a gasket will be compressed between the two laterally extending portions 18 and 25 uniformly in an axial direction, as will appear more fully hereinafter.

After rolling, the formed rings are trued by outwardly expanding dies which have formed elements for engaging the interior surfaces of the rings. The rings are thereby expanded to their desired dimensions and trued in circular form with their joint-closing surfaces true and cylindrical. Formed spigot and bell rings, respectively, are shown in Figs. 4 and 5. So far as the pipe manufacturer is concerned, there only remains that the rings be secured to the steel cylinder or other reinforcing by welding.

Fig. 6 illustrates a longitudinal section through a joint of a concrete pipe utilizing the present invention. Engaged ends of similarly constructed pipes are illustrated. The spigot ring telescopically engages an end of a steel cylinder 27 of one pipe and the bell ring telescopically engages an end of a steel cylinder 28 of another pipe. Owing to the welded seams 29 and 30, the spigot ring, cylinder and bell ring of each pipe constitute a fluid-tight sleeve extending the full length of the pipe. Concrete linings 31 and concrete coverings 32 are molded in contact with the steel cylinder and portions of the spigot and bell rings of each pipe, the lining 31 also serving to line the interior of the spigot ring and the covering 32 also serving to cover the exterior of the bell ring, as shown in Fig. 6.

The spigot ring is provided with three accurately formed annular portions with an intermediate cylindrical bearing surface 16 having a diameter greater than the diameters of adjacent exterior surfaces of the spigot ring. This cylindrical surface 16 is the bearing surface for the spigot of the pipe. The annular recess 33 at the under side of the bearing portion of spigot ring is buttressed by concrete of the inner concrete lining with which the spigot ring is keyed. The radial disposition of the cylindrical gasket-receiving surface 17 with respect to the cylindrical bearing surface 16 is predetermined to fulfill the requirements of a closed joint and is attained by the rolling and trueing process hereinabove described.

The bell ring is provided with two accurately dimensioned inside cylindrical surfaces 23 and 24. The cylindrical surface 23 of the bell serves as a bearing surface of the joint and is of only slightly greater diameter than the cylindrical bearing surface 16 of the spigot which serves as the other bearing surface. The inside cylindrical surface 24 of the bell has such a diameter as to provide more clearance between itself and the cylindrical surface 17 of the spigot ring than the clearance between the bearing surfaces 16 and 23. This relationship of spigot and bell surfaces has the effect of providing a minimum of clearance between the cooperating surfaces outermost of the joint in the interest of preventing the blowing out of the gasket 34 and of avoiding unequal compression of the gasket throughout the pipe circumference. It is important that the surfaces 16 and 17 of the spigot ring and 23 and 24 of the bell ring be parallel with the axis of the pipe, that is to say, truly cylindrical, in order to attain optimum sealing qualities under the various conditions that may obtain in a laid pipe line.

When the joint is closed the gasket is entirely confined within metallic walls which afford excellent protection for the gasket. Should joined pipes slip apart a bit the gasket would still effect a complete seal because the confining surfaces 17 and 23, as well as the bearing surfaces 16 and 23, are cylindrical and the radial distance between the confining surfaces would not change. The joint provided by the spigot and bell rings is therefore particularly suitable for high pressure pipes. Preferably the end 35 of the bell ring is tapered outwardly to facilitate closing of the joint.

By providing the greater clearance in the joint between the immediately opposing surfaces 24 and 17 of the bell and spigot rings, tilting of the axes of connected pipes is permissible on the bearing surfaces 16 and 23 which are located at the outer side of the gasket so that the security of the seal is maintained against outward blowing out whether the axes are tilted or not. With each ring formed of a single piece of strip material and trued to accurate circular form, a minimum clearance between the bearing surfaces of the spigot and bell rings may be obtained and the joint is always centered with the seal uniformly maintained throughout the circumference of the joint.

What is claimed is:

1. In combination, a pipe joint of two joined reinforced concrete pipe sections having engaging spigot and bell ends, a spigot ring of substantially uniform thickness and made from one piece of steel connected at its ends to close the spigot ring, said spigot ring having outside surfaces of different diameters including a cylindrical bearing surface and a cylindrical gasket-receiving surface having a diameter less than that of said bearing surface and a joining surface joining said bearing surface and said gasket-receiving surface for applying axial thrust to a confined gasket; a bell ring of substantially uniform thickness and made from one piece of steel connected at its ends to close the bell ring, said bell ring having inside surfaces of different diameters including a cylindrical bearing surface having a diameter slightly greater than said cylindrical bearing surface of said spigot ring and a second cylindrical surface for disposition over a part of said cylindrical gasket-receiving surface of said spigot ring and having a diameter which provides a clearance between itself and said cylindrical gasket-receiving surface of said spigot ring greater than the clearance between said cylindrical bearing surface of said spigot and said cylindrical bearing surface of said bell ring, and a joining surface joining said cylindrical bearing surface and said second cylindrical surface of said bell ring for applying axial thrust to a confined gasket; and a gasket for sealing the pipe joint, said gasket being adapted for disposition between said two joining surfaces on said spigot ring and said bell ring and between a portion of said cylindrical gasket-receiving surface of said spigot ring and a portion of said cylindrical bearing surface of said bell ring.

2. In combination, a pipe joint of two joined reinforced concrete pipe sections, a spigot ring of substantial uniform thickness made from one piece of steel connected at its ends to close the ring, said spigot ring having outside surfaces of different diameters including a cylindrical bearing surface and a cylindrical gasket receiving surface having a diameter less than that of said bearing surface, and a joining surface joining said bearing surface and said gasket receiving surface for applying axial thrust to a confined gasket, said joining surface being sloped with respect to the axis of the joint; a bell ring of substantially uniform thickness and made from one piece of steel connected at its ends to close the ring, said bell ring having inside surfaces of different diameters including a cylindrical bearing surface having a diameter slightly greater than said cylindrical bearing surface of said spigot ring and a second cylindrical surface for disposition over a part of said cylindrical gasket receiving surface of said spigot ring, said second cylindrical surface having a diameter which provides a clearance between itself and said cylindrical gasket receiving surface on said spigot ring which is greater than the clearance between said cylindrical bearing surface of said spigot and said cylindrical bearing surface of said bell, and a joining surface sloped with respect to the axis of the joint and joining said cylindrical bearing surface and said second cylindrical surface of said bell for applying axial thrust to a confined gasket; and a gasket for sealing the joint, said gasket being confined between said two joining surfaces on said spigot ring and said bell ring, and between a portion of said cylindrical gasket-receiving surface of said spigot ring and a portion of said cylindrical bearing surface of said bell ring.

3. In combination with a concrete pipe having steel reinforcement running longitudinally thereof, a spigot ring made from one piece of steel connected at its ends to close the ring, said spigot ring having an annular spigot portion, an annular bearing portion, an annular portion having connection with said bearing portion and connecting the spigot ring to the steel reinforcing of the pipe, and a sloped portion joining said spigot portion and said bearing portion whereby axial thrust may be applied to a gasket, each of said three annular portions having outer cylindrical surfaces of different diameters; a bell ring made from one piece of steel connected at its ends to close the ring, and having two annular portions of different diameters including an annular portion providing a cylindrical bearing surface having a diameter slightly greater than said cylindrical bearing surface on said spigot ring, and a second annular bell portion having a cylindrical surface dimensioned for disposition over the spigot portion of a complementary spigot ring, and a sloped portion joining said two annular portions of said bell ring, whereby axial thrust may be applied to a gasket confined between the sloped portions of said spigot and bell rings and between said spigot portion of said spigot ring and said bell portion of said bell ring.

PHILIP R. HIRSH.

REFERENCES CITED

The following references are of record in the file of this patent:

UNITED STATES PATENTS

| Number | Name | Date |
| --- | --- | --- |
| 1,976,589 | Trickey | Oct. 9, 1934 |
| 2,138,946 | Trickey | Dec. 6, 1938 |